United States Patent
Tian et al.

(10) Patent No.: US 7,949,195 B2
(45) Date of Patent: *May 24, 2011

(54) PER BLOCK BREAKPOINT DETERMINING FOR HYBRID VARIABLE LENGTH CODING

(75) Inventors: Dihong Tian, San Jose, CA (US); Pi Sheng Chang, San Jose, CA (US); Wen-hsiung Chen, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 1061 days.

This patent is subject to a terminal disclaimer.

(21) Appl. No.: 11/686,778

(22) Filed: Mar. 15, 2007

(65) Prior Publication Data

US 2008/0170625 A1     Jul. 17, 2008

Related U.S. Application Data

(60) Provisional application No. 60/885,075, filed on Jan. 16, 2007.

(51) Int. Cl.
*G06K 9/36* (2006.01)
*H03M 7/34* (2006.01)
(52) U.S. Cl. .............. 382/245; 382/239; 341/51
(58) Field of Classification Search .......... 382/245, 382/239; 341/51
See application file for complete search history.

(56) References Cited

U.S. PATENT DOCUMENTS

| | | | | |
|---|---|---|---|---|
| 4,698,672 A | 10/1987 | Chen et al. | | 358/136 |
| 4,821,119 A | 4/1989 | Gharavi | | 375/240.16 |
| 5,640,420 A | 6/1997 | Jung | | 375/240 |
| 5,751,232 A | 5/1998 | Inoue et al. | | 341/63 |
| 6,140,944 A * | 10/2000 | Toyoyama | | 341/63 |
| 6,829,300 B1 * | 12/2004 | Ichioka | | 375/240.03 |
| 7,203,372 B1 | 4/2007 | Chen et al. | | 382/244 |
| 7,212,681 B1 | 5/2007 | Chen et al. | | 382/248 |
| 7,242,328 B1 | 7/2007 | Chen et al. | | |
| 7,454,076 B2 * | 11/2008 | Chen et al. | | 382/245 |
| 7,492,956 B2 * | 2/2009 | Chen et al. | | 382/245 |
| 7,680,349 B2 * | 3/2010 | Chen et al. | | 382/246 |
| 2003/0118243 A1 * | 6/2003 | Sezer et al. | | 382/245 |
| 2004/0228540 A1 | 11/2004 | Chen et al. | | 382/246 |
| 2005/0226513 A1 * | 10/2005 | Wallace et al. | | 382/232 |
| 2005/0276487 A1 * | 12/2005 | Chen et al. | | 382/232 |
| 2005/0276497 A1 | 12/2005 | Chen et al. | | 382/245 |
| 2005/0276498 A1 | 12/2005 | Chen et al. | | 382/245 |
| 2005/0276499 A1 * | 12/2005 | Wu et al. | | 382/245 |
| 2006/0039615 A1 | 2/2006 | Chen et al. | | 382/232 |
| 2006/0039616 A1 | 2/2006 | Chen et al. | | 382/232 |
| 2006/0039620 A1 | 2/2006 | Chen et al. | | 382/245 |
| 2006/0039621 A1 | 2/2006 | Toebes et al. | | 382/245 |
| 2006/0056720 A1 | 3/2006 | Chen et al. | | 382/245 |
| 2007/0019877 A1 | 1/2007 | Chen et al. | | 382/245 |

\* cited by examiner

*Primary Examiner* — Wenpeng Chen
(74) *Attorney, Agent, or Firm* — Dov Rosenfeld; Inventek

(57) ABSTRACT

A method, and apparatus, and logic encoded in one or more computer-readable tangible medium to carry out a method. The method is to code an ordered sequence of quantized transform coefficients of a block of image data using a hybrid coding method that includes determining a breakpoint location in the sequence between a low frequency region and a high frequency region; coding the low-frequency region using a selected low-frequency variable length coding method; coding the high-frequency region using a selected high-frequency variable length coding method; and coding the location of the breakpoint. The breakpoint location is determined as a function of the sequence such that different sequences can have different breakpoints.

23 Claims, 7 Drawing Sheets

| Freq. index: | 1 | 2 | 3 | 4 | 5 | 6 | 7 | 8 | 9 | 10 | 11 | 12 | 13 | 14 | 15 | 16 | ... | 63 |
|---|---|---|---|---|---|---|---|---|---|---|---|---|---|---|---|---|---|---|
| Coefficients: | 0 | 8 | 5 | 2 | 0 | 3 | 2 | 0 | 0 | 0 | 1 | 1 | 0 | 0 | 1 | 0 | ... | 0 |

FIG. 2

Table 1

| Event | Event Index | Starting position | Accum. Position | Num. of bits |
|---|---|---|---|---|
| N/A | 0 | 0 | 0 | $n_L(0) = 0$ |
| 0 8 5 2 0 | 1 | 1 | 5 | $n_L(5)$ |
| 3 2 0 | 2 | 6 | 8 | $n_L(8)$ |
| 0 0 1 1 0 | 3 | 9 | 13 | $n_L(13)$ |
| 0 1 0 | 4 | 14 | 16 | $n_L(16)$ |

FIG. 3

Table 2

| Event | Event Index | Starting position | Accum. Position | Num. of bits |
|---|---|---|---|---|
| N/A | 0 | 0 | 0 | $n_L(0) + n_H(0)$ |
| 0 8 5 2 0 | 1 | 1 | 5 | $n_L(5) + n_H(5)$ |
| 3 2 0 | 2 | 6 | 8 | $n_L(8) + n_H(8)$ |
| 0 0 1 1 0 | 3 | 9 | 13 | $n_L(13) + n_H(13)$ |
| 0 1 0 | 4 | 14 | 16 | $n_L(16) + n_H(16)$ |

FIG. 4

PER BLOCK BREAKPOINT DETERMINING FOR HYBRID VARIABLE LENGTH CODING

RELATED PATENT APPLICATIONS

The present invention claims priority of and is a conversion of U.S. Provisional Patent Application No. 60/885,075 filed Jan. 16, 2007 to inventors Tian et al., titled BREAKPOINT DETERMINING FOR HYBRID VARIABLE LENGTH CODING. The contents of such U.S. Application No. 60/885,075 are incorporated herein by reference.

The present invention is also related to concurrently filed U.S. application Ser. No. 11/686,860 to inventors Tian et al. titled PER MULTI-BLOCK PARTITION BREAKPOINT DETERMINING FOR HYBRID VARIABLE LENGTH CODING, and U.S. application Ser. No. 11/686,898, to inventors Tian et al. titled BREAKPOINT DETERMINING FOR HYBRID VARIABLE LENGTH CODING USING RELATIONSHIP TO NEIGHBORING BLOCKS. The contents of each such U.S. Application are also incorporated herein by reference.

FIELD OF THE INVENTION

The present disclosure is related generally to image compression and video compression.

BACKGROUND

Modern transform-based image compression methods include transforming blocks of image data, quantizing the transform coefficients, then ordering the coefficients along a path in the two-dimensional coefficient plane, and entropy coding the ordered sequence of quantized coefficients. Quantization is such that 0 is the most-likely-to-occur coefficient amplitude. Conventional two-dimensional variable length coding is commonly used in image and video compression for the entropy coding, and includes coding the position of each non-zero-value coefficient and its amplitude simultaneously as a pair, which typically results in a shorter average code length than coding the position and amplitude separately. In a block-based transform coding, however, there are often a number of consecutive non-zero-value coefficients along a low-frequency region of the coding path. Instead of using a single code to represent the "n" consecutive coefficients, conventional two-dimensional variable length coding requires "n" separate codes, which is inefficient. Hybrid variable length coding was recently introduced and includes coding a first region in the ordered sequence—the low-frequency region—differently than the coefficients in a second higher-frequency region. One embodiment of hybrid variable length coding uses a low-frequency coding method that takes advantage of the clustered nature of the quantized non-zero coefficients in the low-frequency region and a high-frequency coding method that takes advantage of the scattered nature of the quantized non-zero coefficients in the high-frequency region.

The position along the sequence where the coding method changes the low-frequency region coding method to the high-frequency region coding method is called the "breakpoint." One aspect of hybrid variable length coding is determining the location of the breakpoint that separates the one, e.g., low-frequency region from the other, e.g., high-frequency region. Such a breakpoint must be known to a decoder to properly decode the coded coefficients. A constant breakpoint for an entire video sequence has been found to be not optimal.

SUMMARY

Embodiments of the present invention include a method, and apparatus, and logic encoded in one or more computer-readable tangible medium to carry out a method. The method is to code an ordered sequence of quantized transform coefficients of a block of image data using a hybrid coding method that includes determining a breakpoint location in the sequence between a low frequency region and a high frequency region; coding the low-frequency region using a selected low-frequency variable length coding method; coding the high-frequency region using a selected high-frequency variable length coding method; and coding the location of the breakpoint. The breakpoint location is determined as a function of the sequence such that different sequences can have different breakpoints.

Other embodiments include a method, and apparatus, and logic encoded in one or more computer-readable tangible medium to carry out a method. The method is to decode a bitstream comprising codewords encoded by a method to code an ordered sequence of quantized transform coefficients of a block of image data using a hybrid coding method that includes determining a breakpoint location in the sequence between a low frequency region and a high frequency region; coding the low-frequency region using a selected low-frequency variable length coding method; coding the high-frequency region using a selected high-frequency variable length coding method; and coding the location of the breakpoint. The breakpoint location is determined as a function of the sequence such that different sequences can have different breakpoints. The Decoding method includes accepting the bitstream, recognizing codewords in the bitstream, and decoding the codewords in the bitstream.

One method embodiment includes a method comprising, for an ordered sequence of quantized transform coefficients of a block of image data, the quantized transform coefficients having respective amplitudes including a most likely-to-occur amplitude and at least one other amplitude, and for a selected low-frequency variable length coding method that includes recognizing events that each includes a cluster of coefficients having respective amplitudes other than the most likely-to-occur amplitude, determining a set of possible breakpoints, each breakpoint being the end of an ending event recognized by the selected low-frequency coding method, and the results of coding the ordered sequence using a hybrid coding method that includes using the selected low-frequency coding method until the ending event and a selected high-frequency method to encode a part of the sequence \ starting from immediately after the ending event.

One embodiment of the determining of possible breakpoints includes (a) encoding an ordered sequence of quantized transform coefficients of the block of image data using the selected low-frequency variable length coding method that includes recognizing events that each includes a cluster of coefficients having respective amplitudes other than the most likely-to-occur amplitude; and (b) encoding the ordered sequence using a selected high-frequency variable length coding method to determine the numbers of bits to encode different parts of the sequence, each different part starting from after respective different event locations of the different events recognized in the selected low-frequency method used in (a). The total number of bits to encode the whole sequence for different ending event locations for events recognized in (a) is the sum of the number of bits resulting from the encoding in (a) to encode a first part of the sequence up to and including the ending event, and the number of bits resulting from the encoding of (b) to encode a second part of the sequence starting from after respective different ending events.

The method further includes comparing the possible breakpoints, e.g., by comparing the results of using different ending event locations, and selecting as a final ending event the ending event that results in the least total number of bits. One embodiment further includes: encoding the sequence including encoding a first portion of the sequence up to and including the final ending event using the selected low-frequency variable length coding method and encoding a second portion of the sequence from the first coefficient after the final ending event to the end of the sequence using the selected high-frequency variable length coding method. One embodiment further includes encoding the location of the final ending event.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

BRIEF DESCRIPTION OF THE DRAWINGS

FIG. 2 shows an example ordered sequence of AC coefficients after quantization of an 8×8 block of transformed image data along a pre-defined path, e.g., a zigzag path, together with the frequency index starting with index 1. The Sequence of FIG. 2 is used to illustrate an embodiment of the present invention.

FIG. 3 shows a table constructed in an implementation of the first-pass coding process of an embodiment of the invention applied to the example sequence of FIG. 2.

FIG. 4 shows an updated table in an implementation of the second-pass coding process of an embodiment of the invention applied to the example sequence of FIG. 2.

DESCRIPTION OF EXAMPLE EMBODIMENTS

Figure 1:
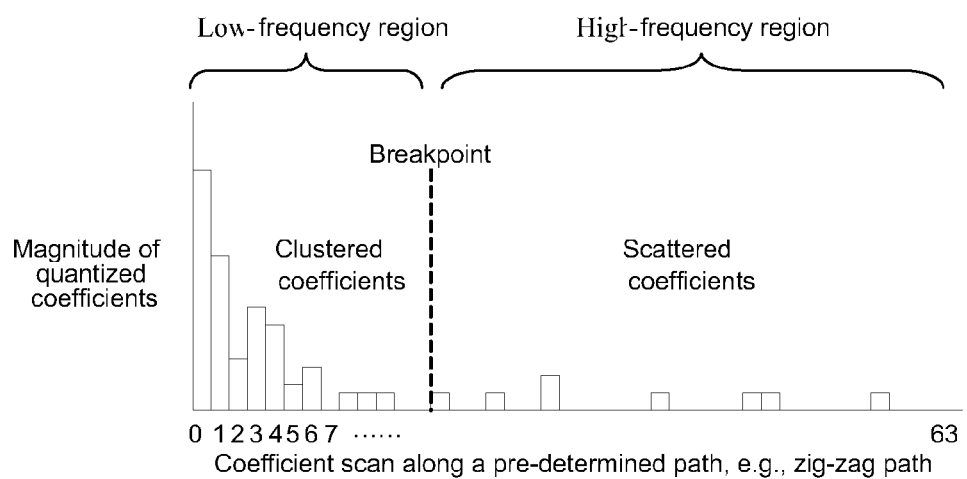
FIG. 1 shows a typical distribution of an ordered sequence of quantized coefficients of a transform block of image data.

In the description herein, it is assumed that a frame to be encoded is divided into blocks of image data. These blocks might be motion compensated, and a difference block might be determined after motion compensation. Each resulting block of image data is transformed by some transform, e.g., DCT or other transforms The coefficients are ordered, e.g., along the pre-determined path on the two-dimensional distribution, and then quantized. The description herein assumes that the quantization is to integer values that have sign and amplitude, and that zero is the most likely-to-occur amplitude, and 1 is the next most-likely-to-occur amplitude. Of course it is possible to quantize differently—the different quantized values are, after all, no more than labels that represent ranges of values. It would be straightforward for one in the art to modify the methods and techniques and apparatuses described herein to take into account other quantization schemes where zero is not the most likely-to-occur amplitude value, and/or 1 is not the next to most likely-to-occur amplitude value. The rest of this description therefore assumes, without loss of generality, that the ordered sequence of quantized coefficients has 0 as the most likely-to-occur amplitude value, and 1 as the next-to-most likely-to-occur amplitude value.

Conventional two-dimensional (2D) variable length coding (VLC), commonly adopted in image and video compression, is based on a run and amplitude level representation of an ordered sequence of quantized transform coefficients determined by ordering the coefficients along a pre-defined path, e.g., zigzag path for an N×N coefficient block. Such ordering is from low-frequency to high-frequency. Conventional two-dimensional variable length coding is therefore referred to as run-amplitude level variable length coding herein. Run-amplitude level variable length coding includes collecting or assuming statistics of non-zero coefficient amplitudes and of the number of zero-valued coefficients—the run-length of zeros that precede any non-zero amplitudes along the ordering of the sequence. A two-dimensional table consisting of the amplitude and the run-length is then constructed, and optimal variable length codes such as Huffman codes are assigned to represent the events in the table.

The advantage of run-amplitude level variable length coding is that the position of each non-zero-value coefficient and its amplitude are coded simultaneously as a pair, which results in a shorter average code length than coding the position and amplitude separately. In block-based transform coding, however, there are often a number of consecutive non-zero-value coefficients along the lower frequency region of the ordering of the sequence. Instead of using a single code to represent the "n" consecutive coefficients, run-amplitude level variable length coding requires "n" separate codes, which is inefficient. Hybrid variable length coding is known, and overcomes this deficiency. See, for example, U.S. patent application Ser. No. 10/869,229, filed 15 Jun. 2004 to inventors Chen, et al., published as US 20050276487, and titled "A HYBRID VARIABLE LENGTH CODING METHOD FOR LOW BIT RATE VIDEO CODING," now U.S. Pat. No. 7,454,076. The elements disclosed therein are referred to collectively and individually herein as the "Basic Hybrid VLC Method." See also U.S. patent application Ser. No. 10/898,654, filed 22 Jul. 2004 to inventors Chen, et al., published as US 20050276497, and titled "AN EXTENDED HYBRID VARIABLE LENGTH CODING METHOD FOR LOW BIT RATE VIDEO CODING," now U.S. Pat. No. 7,483,584. The elements disclosed in U.S. Ser. No. 10/898,654 are referred to collectively and individually as the "Extended Hybrid VLC Method" herein. See also U.S. patent application Ser. No. 10/922,508, filed 18 Aug. 2004 to inventors Toebes, et al., and titled "TWO-DIMENSIONAL VARIABLE LENGTH CODING OF RUNS OF ZERO AND NON-ZERO TRANSFORM COEFFICIENTS FOR IMAGE COMPRESSION," now U.S. Pat. No. 7,471,840. The elements disclosed in U.S. Ser. No. 10/922,508 are referred to collectively and individually as the "2-D Non-Zero/Zero Cluster VLC Method" herein.

Hybrid coding can be extended to include more than two regions. However, for the remainder of this description, when speaking of a first and second region, it is assumed that there are two regions with a single breakpoint. The breakpoint determining is for this region between the first (low-frequency) region and the second (high-frequency) region.

FIG. 1 shows a typical distribution of an ordered sequence of quantized coefficients of a transform block of image data. As depicted in FIG. 1, the quantized non-zero coefficients in the low-frequency are likely to be more clustered than in the high-frequency region where non-zero coefficients are likely to be scattered. One embodiment of hybrid variable length coding uses coding methods that respectively take advantage of the clustered nature of the coefficients in the low-frequency region and the scattered nature of the quantized non-zero coefficients in the high-frequency region. In one embodiment, hybrid variable length coding uses two types of position coding schemes. In one embodiment of hybrid variable length coding, in the low-frequency region, runs of consecutive zero-valued coefficients and runs of consecutive non-zero-valued coefficients are coded as a pair using a two-dimensional variable length coding table. In one embodiment of hybrid variable length coding, the amplitudes of the non-zero-valued coefficients are then coded by an independent, one-dimensional variable length coding table. In the high-frequency region, run-amplitude level variable length coding or a similar two-dimensional variable length coding scheme is retained to code the position and amplitude of each non-zero-valued coefficient as a pair.

The switching position between the low-frequency and high-frequency coding schemes is termed a "breakpoint", which must be known to the decoder to properly decode the coefficients. Determining or pre-selecting a breakpoint is required for the coding using hybrid variable length coding, and how this is determined can make a difference to the achieved coding efficiency. On one hand, given the low-frequency and high-frequency coding schemes, there exists an optimal breakpoint within each block of coefficients, which results in the minimum number of bits in the coded coefficients. On the other hand, this optimal breakpoint varies among blocks and therefore needs to be included in the bitstream, which may introduce a considerable overhead if it is not efficiently coded. We have studied hybrid variable length coding using a constant breakpoint for the entire video sequence, and found that a single constant breakpoint, while leading to reasonable performance, is not optimal.

Different methods and approaches are described herein for performing hybrid variable length coding with variable breakpoints. These approaches generally include two elements: a method to find a proper breakpoint for at least one block of coefficients, and a method to code the breakpoint in an explicit or implicit fashion. The details of different embodiments of these approaches are described herein below.

In the remainder of this description, unless otherwise noted, it is assumed that a method that combines a two-dimensional position coding scheme with a one-dimensional amplitude (2DP1DA) coding scheme, e.g., 2-D Non-Zero/Zero Cluster VLC Method as described in U.S. Ser. No. 10/922,508 is used for coding the low-frequency coefficients, while conventional run-amplitude level variable length coding is used for coding the high-frequency coefficients. Note that in 2DP1DA, 2DP means two-dimensional position coding, and 1DA means one-dimensional amplitude. Furthermore, the DC value in of the transform of the block of image data is assumed to be encoded separately, so that only the AC coefficients are included. Note that the methods described herein are not limited to using a 2DP1DA coding scheme, and are generally applicable to any alternative low-frequency coding scheme and any alternative high-frequency coding scheme, with or without modifications, and also to encoding the DC value with the remainder of the quantized coefficients.

For example, in addition to conventions two-dimensional variable length coding, the following provide alternate methods for the different, e.g., low-frequency and/or high-frequency regions, and those in the art will understand if and how to modify and incorporate the methods described therein for the low-frequency and/or high-frequency methods:

- U.S. patent application Ser. No. 10/439,536 filed 16 May 2003 to inventors Chen et al, titled VARIABLE LENGTH CODING METHOD AND APPARATUS FOR VIDEO COMPRESSION, published as US 20040228540, now U.S. Pat. No. 7,194,137.
- U.S. patent application Ser. No. 10/342,537 filed 15 Jan. 2003 to inventors Chen et al, titled AN EXTENSION OF TWO-DIMENSIONAL VARIABLE LENGTH CODING FOR IMAGE COMPRESSION, now U.S. Pat. No. 7,212,681.
- U.S. patent application Ser. No. 10/440,595 filed 19 May 2003 to inventors Chen et al, titled AN EXTENSION OF TWO-DIMENSIONAL VARIABLE LENGTH CODING FOR IMAGE COMPRESSION, now U.S. Pat. No. 7,203,372.
- U.S. patent application Ser. No. 10/869,229 filed 15 Jun. 2004 to inventors Chen et al, titled A HYBRID VARIABLE LENGTH CODING METHOD FOR LOW BIT RATE VIDEO CODING, and published as US 20050276487, now U.S. Pat. No. 7,454,076.
- U.S. patent application Ser. No. 10/898,654 filed 22 Jul. 2004 to inventors Chen et al, titled AN EXTENDED HYBRID VARIABLE LENGTH CODING METHOD FOR LOW BIT RATE VIDEO CODING and published as US 20050276497, now U.S. Pat. No. 7,483,584.
- U.S. patent application Ser. No. 10/910,712 filed 3 Aug. 2004 to inventors Chen et al, titled VIDEO COMPRESSION USING MULTIPLE VARIABLE LENGTH CODING PROCESSES FOR MULTIPLE CLASSES OF TRANSFORM COEFFICIENT BLOCKS and published as US 20050276498, now U.S. Pat. No. 7,454,073.
- U.S. patent application Ser. No. 10/922,508 filed 18 Aug. 2004 to inventors Toebes et al, titled TWO-DIMENSIONAL VARIABLE LENGTH CODING OF RUNS OF ZERO AND NON-ZERO TRANSFORM COEFFICIENTS FOR IMAGE COMPRESSION and published as US 20060039621, now U.S. Pat. No. 7,471,840.
- U.S. patent application Ser. No. 10/922,507 filed 18 Aug. 2004 to inventors Chen et al, titled VIDEO CODING USING MULTI-DIMENSIONAL AMPLITUDE CODING AND 2-D NON-ZERO/ZERO CLUSTER POSITION CODING and published as US 20060039620, now U.S. Pat. No. 7,492,956.
- U.S. patent application Ser. No. 11/069,622 filed 28 Feb. 2005 to inventors Chen et al, titled AMPLITUDE CODING FOR CLUSTERED TRANSFORM COEFFICIENTS and published as US 20060039616, now U.S. Pat. No. 7,499,596.
- U.S. patent application Ser. No. 11/069,621 filed 28 Feb. 2005 to inventors Chen et al, titled JOINT AMPLITUDE AND POSITION CODING FOR PHOTOGRAPHIC IMAGE AND VIDEO CODING and published as US 20060039615, now U.S. Pat. No. 7,499,595.
- U.S. patent application Ser. No. 11/069,620 filed 28 Feb. 2005 to inventors Chen et al, titled ADAPTIVE BREAKPOINT FOR HYBRID VARIABLE LENGTH CODING and published as US 20050276499, now U.S. Pat. No. 7,471,841.
- U.S. patent application Ser. No. 11/270,138 filed 9 Nov. 2005 to inventors Chen et al, titled EXTENDED AMPLITUDE CODING FOR CLUSTERED TRANSFORM COEFFICIENTS and published as US 20060056720, now U.S. Pat. No. 7,620,258.

U.S. patent application Ser. No. 11/385,183 filed 20 Mar. 2006 to inventors Chen et al, titled VARIABLE LENGTH CODING FOR CLUSTERED TRANSFORM COEFFICIENTS IN VIDEO COMPRESSION, now U.S. Pat. No. 7,680,349.

U.S. patent application Ser. No. 11/346,757 filed 3 Feb. 2006 to inventors Chen et al, titled VARIABLE LENGTH CODING FOR SPARSE COEFFICIENTS, now U.S. Pat. No. 7,242,328.

The contents of each of the above patent applications are incorporated herein by reference, except that the incorporation by reference of the material herein excludes any information incorporated by reference in such incorporated by reference material, unless such information is explicitly incorporated herein by reference.

Two-Dimensional Position and One-Dimensional Amplitude Coding (2DP1DA)

For completeness, an example of 2DP1DA is included. Encoding the low-frequency region coefficients includes recognizing events describable by one or more parameters, such as the run-lengths of zero value coefficients, run-lengths of non-zero-amplitude coefficients, amplitudes, signs, and so forth. These parameter(s) are encoded, e.g., by a lookup device to look up appropriate one or more lookup tables.

One embodiment of two-dimensional (2D) variable length coding jointly encodes 2D position events (2DP events) that include any run of consecutive zero-valued coefficients preceding a run of non-zero-valued coefficients. So jointly encoding events by a 2D variable length code is found to be, on average, more efficient, for example, than encoding the same events by two independent 1D variable length codes.

In one embodiment, a single zero immediately following each non-zero coefficient cluster is included as part of the 2DP event. This effectively reduces the run-length of the zero-valued coefficients by 1 and the dimension representing run-lengths of zero-valued coefficients will start from 0 instead of 1.

Thus, one embodiment of encoding the low-frequency region of a sequence of coefficients includes two-dimensional position coding to encode events that include any run of zero-valued coefficients preceding a run of non-zero-valued coefficients, and encoding amplitude events using one-dimensional amplitude coding for the non-zero-amplitudes in the runs. No immediately preceding run of zeroes is indicated by a run-length of zero.

The inventors have found that extending the 2D position events can be extended to include the "last" information representing the end of the block. Using two-dimensional position and one-dimensional amplitude coding, consider the sample coefficient sequence:

2 3 2 −1 −1 0 0 1 −1 1 . . .

This is encoded as:

$C_p(0, 5, 0)C_A(2)S(0)C_A(3)S(0)C_A(2)S(0)C_A(1)S(1)C_A(1)S(1)C_p(1, 3, 1) C_A(1)S(0)C_A(1)S(1)C_A(1)S(0)$ where $C_p$(zrun, nzrun, last) denotes the 2D position code of an identified event. Note that in the above stream of codewords, the second position code is "$C_p(1, 3, 1)$" rather than "$C_p(2, 3, 1)$" because the first zero coefficient has been implicitly included in the first position event coded as $C_p(0, 5, 0)$.

While such 2D position coding is anticipated to provide on average improved coding efficiency over two 1D position coding, the size of the code table used is increased. For an 8×8 block, i.e., 64 coefficients along the scan path, the total size of a 2-D code table is roughly 2×63×64=8K, including accounting for the last information. In practice, to reduce the table size, events that are relatively unlikely to appear may be coded by an "Escape" code followed by fixed numbers of bits, which indicate the runs of zero- and non-zero-valued coefficients as well as the last information.

Method to Determine a Breakpoint Per Block

One method embodiment includes, for a plurality of blocks of image data and a respective ordered sequence of quantized transform coefficients in each block, and for a pre-selected low-frequency coding method and a pre-selected high-frequency coding method, determining a breakpoint for each block. In one embodiment, the coding of the sequence results in a relatively low number of bits compared to using a single breakpoint value for all the blocks. One embodiment determines the optimal per-blocks breakpoint that results in a minimum number of bits after coding of all the blocks One method embodiment further includes encoding the determined breakpoint value using variable length coding.

Determining the Per-Block Breakpoint

Figure 5:
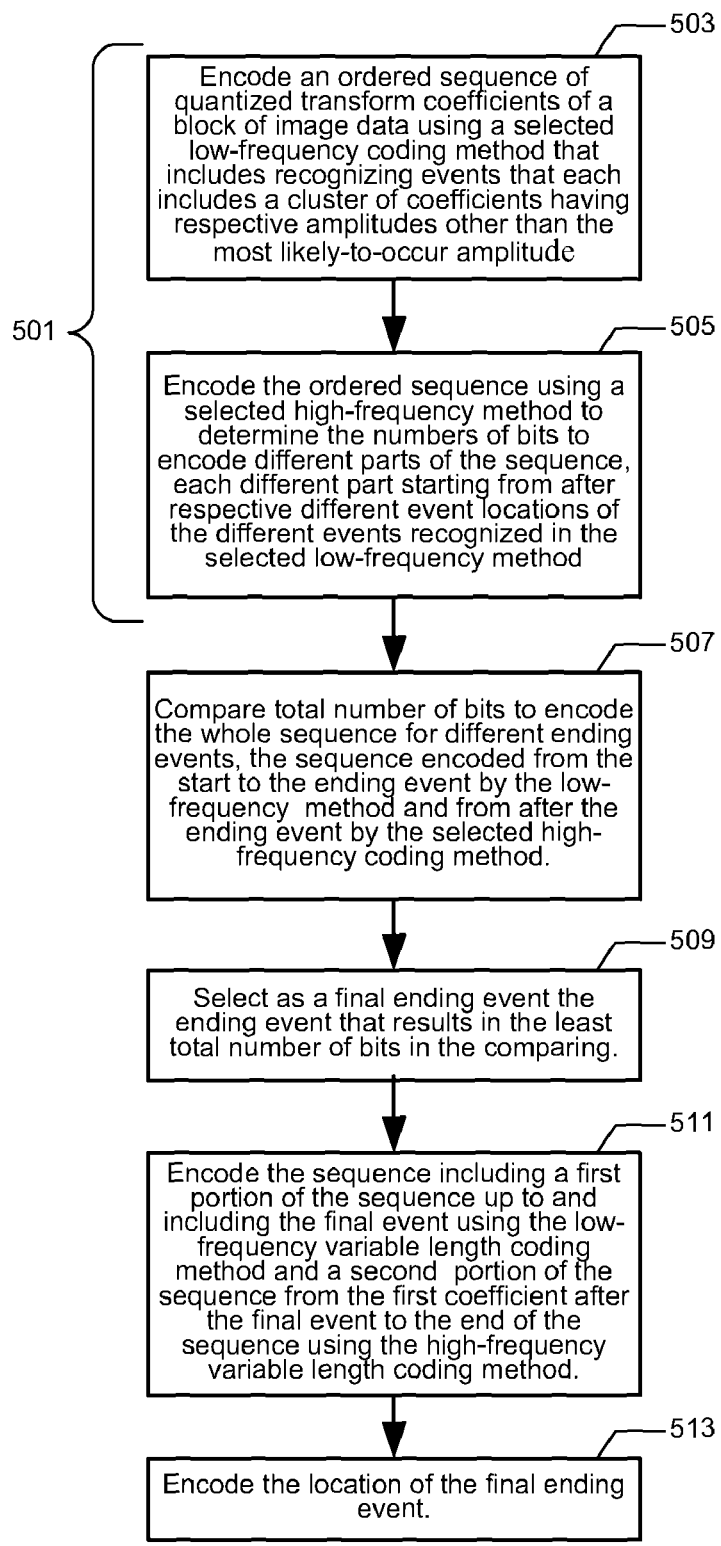
FIG. 5 shows a simplified flowchart of one embodiment of a method of determining a breakpoint for a block of coefficients that includes a two-pass process.

FIG. 5 shows a simplified flowchart of one embodiment of determining a breakpoint for a block of coefficients. Suppose a low-frequency coding method and a high-frequency coding method are selected. The selected low-frequency coding method includes recognizing events, e.g., position events that each includes a cluster of coefficients having respective amplitudes other than the most likely-to-occur amplitude, e.g., non-zero amplitudes, and recognizing amplitude events, or in other embodiments, recognizing joint position and amplitude events that each includes a cluster of coefficients. The method includes in 501 determining a set of possible breakpoints, each breakpoint being the end of an ending event recognized by the selected low-frequency coding method, and the results of coding the ordered sequence of quantized transform coefficients of the image data of the block using a hybrid coding method that includes using the selected low-frequency coding method until the ending event and the selected high-frequency method to encode the a part of the sequence starting from immediately after the ending event.

One embodiment of 501 includes a two-pass method as shown in FIG. 5. In 503, a first pass coding process includes encoding the ordered sequence using the selected low-frequency variable length coding method. The coding process starts from the lowest-frequency quantized coefficient—typically lowest frequency AC quantized coefficient. In one embodiment, in order to be able to determine the numbers of bits used for the encoding, a data structure, e.g., a table is constructed for different locations of the ending event and tabulating the number of bits required to encode the portion of the sequence up to the ending event. In the example low-frequency coding method, position events include a run of any zero-valued coefficients that end in a single zero-valued coefficient. In one embodiment, a data structure is maintained that records three quantities for each ending event location that is coded by 2D position coding: the starting position of the event, e.g., starting with a position 0, the ending position of the event, and the accumulated number of bits that has been consumed to code the coefficients up to and including the ending event.

FIG. 2 shows an example ordered sequence of AC coefficients after quantization of an 8×8 block of transformed image data along a pre-defined path, e.g., a zigzag path, together with the frequency index starting with index 1 and ending with an index 63.

FIG. 3 shows as Table 1 the table constructed as an implementation of 503 in the first-pass coding process for the example sequence of FIG. 2. The first column in the table is an index of the ending event, starting in one embodiment with an ending event index value 0, a null entry to indicate the state prior to the coding process. Note that the ending position of a low-frequency two-dimensional position (2DP) event is the frequency index of the zero-value coefficient that follows the run of consecutive non-zero-value coefficients following any preceding run of consecutive zero-value coefficients. For example, the first 2DP event starts at frequency index 1 and ends at frequency index 5 instead of 4. The accumulated number of bits for coding the coefficients up to and including the ending event is denoted by "$n_L(x)$" where "x" is the ending position of the ending event. In this example, $n_L(0)=0$ for the first entry in the table, and, because the final ending event ends at index 16, $n_L(16)$ denotes the total number of bits for coding the entire block by the low-frequency coding scheme.

Referring again to the flowchart of FIG. 5, a second pass coding process includes in 505 encoding the sequence of the blocks using the selected high-frequency variable length coding method to determine the number of bits to encode different parts of the sequence each different part starting from after respective different ending event locations from the low-frequency method used in 503. In one embodiment, the selected high-frequency variable length coding method is performed in a reverse order starting from the non-zero-value coefficient that has the highest frequency index. In one embodiment, the accumulated number of bits of coding each part between the end and each ending event used in 503 is noted. Once the coding process reaches an ending position that was recorded in the first pass using the low-frequency coding method, the method adds the accumulated number of bits consumed by the high frequency method, in this case the run-amplitude level variable length coding to the corresponding entry from the first pass in the table.

Thus, in one embodiment, the second pass 505 includes noting the total number of bits to encode the whole sequence for different ending events, the sequence encoded from the start to the ending event by the low-frequency method and from after the ending event by the selected high-frequency coding method. This completes 501 of determining the results of using different ending event locations, so different possible breakpoints.

In one embodiment, the data in the table of FIG. 3 is updated with additional information about encoding using the high-frequency coding method to become an updated table. FIG. 4 shows as Table 2 such an updated table after the second-pass coding of 505. In FIG. 4, "$n_H(x)$" denotes the accumulated number of bits when run-amplitude level variable length coding proceeds to position "x" in a reverse order. In contrast to the first-pass coding, note that index 16 is the starting state, so $n_H(16)=0$, and $n_H(0)$ is the total number of bits for coding the entire block by run-amplitude level variable length coding.

Referring again to FIG. 5, 507 includes comparing the total number of bits to encode the whole sequence for different ending event locations for events recognized in the first pass encoding of 503, the total number of bits being the number of bits resulting from the encoding in 503 to encode a first part of the sequence up to and including the ending event, and the number of bits resulting from the encoding of 505 to encode a second part of the sequence starting from after respective different ending events.

In FIG. 5, 509 includes selecting as a final ending event the ending event that results in the least total number of bits in the comparing of 507.

Thus, in accordance with an embodiment of the first method to find the optimal breakpoint, the optimal breakpoint for coding the block by hybrid variable length coding is obtained by finding the entry with the minimum number of bits in the table resulting from the second pass coding method, e.g. Table 2 of FIG. 4, which indicates the optimal switching position of hybrid variable length coding from low-frequency coding to high-frequency coding. For example, in FIG. 4, if the third entry (event index=2) provides the minimum number of bits, it means that the optimal hybrid variable length coding should encode the coefficients with frequency indices 1 to 8 by low-frequency coding and the remaining coefficients by high-frequency coding.

In FIG. 5, 511 includes encoding the sequence by encoding a first portion of the sequence up to and including the final ending event using the selected low-frequency variable length coding method and encoding a second portion of the sequence from the first coefficient after the final ending event to the end of the sequence using the selected high-frequency variable length coding method.

Coding the Breakpoint

In FIG. 5, 513 includes encoding the location of the final ending event that defines the breakpoint. In one embodiment, the per-block breakpoint found is a "soft" breakpoint in that it defines a position that the breakpoint is at the end of an event coded by the low frequency coding method. The breakpoint can therefore be coded in 513 by any indication of a location in the sequence between the starting position and the ending position of the final ending event coded by the low-frequency coding scheme, e.g., by a frequency index between the index values of the start and end of such final ending low-frequency event. A decoder decoding the resulting bitstream will not switch to high-frequency decoding until it reaches a position that is beyond the location coding the breakpoint after decoding a low-frequency-method encoded event. In the example of FIG. 4, an encoding of any one of the frequency indices 6, 7, and 8 can be used to encode the breakpoint, and a decoder will properly switch to run-amplitude level variable length decoding at the frequency index of 9.

In one embodiment, the starting position of the final ending low-frequency event is selected, and encoded by a variable length code, e.g., using a one-dimensional variable length coding table. It is believed that because such a choice has the smallest absolute value it will require a shorter codeword on average. In one embodiment, a one-dimensional variable length coding table is constructed using actual or assumed statistics to assign code words to the breakpoints.

Representing the optimal breakpoint by a coefficient index suggests that, for an N×N transform block, variable length codes need to be assigned to values from 0 to $N^2-1$. Instead of using the coefficient index, a first alternative embodiment of the first method of encoding the optimal breakpoint value includes encoding a number representing the ordinal value of the final ending event that is coded by low-frequency coding method, in other words, an index representing which of the ending events is the final ending event, e.g., the index 1 if the final ending event is the first ending event, the index 2 if the final ending event is the second ending event, and so forth. In one embodiment, the index representing the ordinal value of the final ending event is encoded by a variable length coding method.

In those embodiments in which the final ending event index is encoded to provide a breakpoint encoding, a breakpoint encoding decoded as a value K means that a decoder, receiving this decoded breakpoint value K, after decoding the K-th event should switch from decoding codewords coded by the low-frequency coding scheme to decoding codewords coded by the high-frequency coding scheme. In the example of FIGS. 2-4, for example, the final ending event is the second event, so that the optimal breakpoint would be encoded by encoding the event index of 2.

Note that in general, the event index is a much smaller value than the coefficient index. In addition, because each low-frequency (2DP) event contains at least two coefficients: one non-zero-valued coefficient and its following zero-valued coefficient, the maximum index of the low-frequency event is $N^2/2$, which halves the size of the variable length coding table in those embodiments in which a variable length coding table is used.

Empirically, the inventors observed that using the event index results in more condensed statistics of the optimal breakpoints, and therefore, more efficient compression of the breakpoints.

Figure 6A:
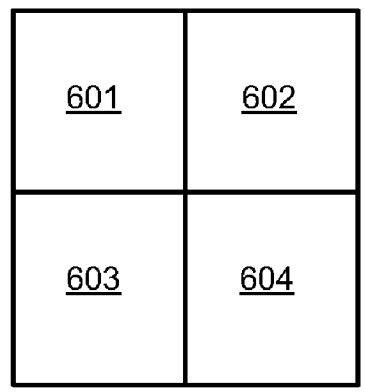
FIG. 6A shows an illustration of a 2-block by 2-block superblock for the sequences of quantized transforms coefficients of four blocks.

In one embodiment coding the breakpoint includes coding the breakpoints of several blocks in a joint manner using multi-dimensional variable length coding. Consider a partition of adjacent blocks whose breakpoint is to be jointly coded. Denote by $N_B$ the number of blocks whose breakpoint is so jointly encoded. While these adjacent blocks can for a partition of any shape, in some embodiments of the invention, the partition is rectangular, in that the $N_B$ blocks form what we call a "superblock" of $N_{B1}$ blocks by $N_{B2}$ blocks, where $N_B=N_{B1} \times N_{B2}$. FIG. 6A shows an illustration of a 2-block by 2-block superblock 605 in which the breakpoints are denoted $K_1, K_2, K_3$, and $K_4$ for the sequences of quantized transforms coefficients of the four blocks 601, 602, 603, and 604 of image data. In this manner, the breakpoints for a 2-block by 2-block, e.g., 16 by 16 "superblock" 605 of image data are jointly encoded.

Figure 6B:
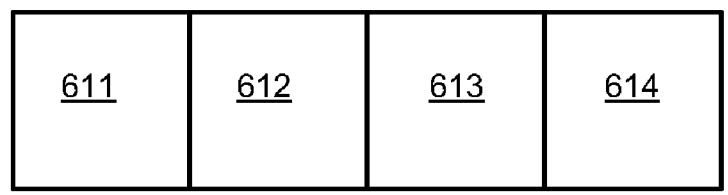
FIG. 6B shows an illustration of a 1 block by 4 block superblock for the sequences of quantized transforms coefficients of four blocks.

FIG. 6B shows an illustration of a 1 block by 4 block superblock 610 in which the breakpoints are denoted also $K_1$, $K_2, K_3$, and $K_4$ of the four blocks 611, 612, 613, and 614 of image data.

One embodiment includes concatenating the breakpoints of the blocks, $K_1, K_2, \ldots K_{N_B}$ as a joint event $K_{N_B} | \ldots | K_3 | K_2 | K_1$, where | denotes concatenation, and includes jointly encoding the joint event using a $K_{N_B}$-dimensional variable length coding table to assign a codeword to the joint event. In the case of a 2-block by 2-block superblock, the jointly encoding the joint event $K_4 | K_3 | K_2 | K_1$ is jointly encoded by a four-dimensional coding table. The four-dimensional variable length coding table is constructed from assumed or collected statistics.

In one embodiment, the codewords for each superblock of data, i.e., the codewords corresponding to the $N_B$ ordered sequences of quantized transform coefficients are sent with a separate header that includes the codeword for the $N_B$ breakpoints for the $N_B$ blocks in the superblock.

The inventors have observed that in many cases, one or more blocks in a multi-block superblock may have transform coefficients all equal to zero. In such a case, the header sent with the codewords for the superblock can include an indication that the coefficients of one or more particular blocks are all zeroes, so the respective blocks' decoding can be skipped.

To take advantage of such existing information, one embodiment uses a different dimensioned variable length coding table from a set of different dimensioned variable length coding tables to encode those breakpoints of those blocks of the superblock that have non-zero-valued coefficients. In FIG. 6A, for example, if one of the four blocks in the superblock has only zero-valued quantized transform coefficients, no breakpoint is encoded for that block, and a three-dimensional variable length coding table is used to jointly encode the three breakpoints of the remaining blocks. In such an example scenario, four variable length coding tables are pre-constructed in a one-to-one correspondence to the four cases where there are 1, 2, 3, or 4 blocks in the superblock that have any non-zero-value coefficients. As an extension, multiple variable length coding tables may also be constructed within each of the four cases to further differentiate the situations where blocks at certain locations have non-zero-value coefficients.

Additional Low-Frequency Coding Methods

Different embodiments of the invention can use different methods for the low-frequency variable length coding method, and also different methods for the high-frequency coding methods.

One embodiment of the low-frequency coding method is described above and includes two-dimensional position and one-dimensional amplitude coding (2DP1DA).

One-Dimensional Position and One-Dimensional Amplitude Coding (1DP1DA)

One embodiments of the low-frequency variable length coding method includes using one-dimensional position and one-dimensional amplitude coding (1DP1DA) to represent the position and the coefficient amplitudes of any clusters in the low-frequency region. Conventional run-level coding is used to represent the position and amplitude information for each non-zero-valued coefficient individually. In one embodiment, for a cluster of non-zero-valued coefficients, an alternative way of denoting the position and amplitude information is to indicate (a) the run of zero-valued coefficients preceding the non-zero cluster, (b) the run of non-zero-valued coefficients in the cluster, and (c) the magnitudes (and the signs) of the non-zero-valued coefficients. Three symbols: zrun, nzrun, and level, are used to denote the information. Thus, one embodiment includes recognizing events that are denoted by these symbols.

In one embodiment, each of the events denoted by these is encoded by a variable length code, e.g., using a variable length coding (VLC) table. Such a VLC table can be constructed by collecting statistics of consecutive non-zero-valued coefficients from test video sequences, or assuming such statistics, and applying Huffman coding to the collected statistics. Note that in practice, some of the less likely-to-occur events are encoded by fixed length codes. Because both the position and amplitude information is encoded by one-dimensional (1D) VLC, such a coding scheme for low-frequency coefficients is referred to as one-dimensional position and one-dimensional amplitude coding herein. An encoder finds events that include the run-length of zero-valued coefficients, the run-length of non-zero-valued coefficients, and the amplitudes of the non-zero-valued coefficients, and encodes them using three respective 1D VLC tables. In one embodiment, the codewords are then concatenated to present a complete bitstream.

As an example, consider the following low-frequency quantized coefficients of a block after the zig-zag ordering process:

2 3 2 −1 −1 0 0 1 −1 1 | 0 0 . . .

where | represents the breakpoint. Coding the above coefficients by one-dimensional position and one-dimensional amplitude coding generates the following codeword stream:

$C_n(5)C_A(2)S(0)C_A(3)S(0)C_A(2)S(0)C_A(1)S(1)C_A(1)S(1)$
$C_z(2)C_n(3)C_A(1)S(0)C_A(1)S(1) C_A(1)S(0)$EOB where $C_n(\cdot)$, $C_z(\cdot)$, and $C_A(\cdot)$ denotes the codes for the run-length of non-zero-valued coefficients, the run-length of zero-valued coefficients, and the amplitude of the non-zero-valued coefficient, respectively. S(0) and S(1) denote + and − signs of a non-zero-valued coefficient, respectively. EOB represents an "end-of-block" symbol and is used to indicate the end of non-zero-valued coefficients in the block.

Two-Dimensional Position and Multi-Dimensional Amplitude Coding (2DPmDA)

One embodiment of the invention that uses hybrid coding includes recognizing and encoding two-dimensional position events and rather than using one-dimensional amplitude variable length coding, uses multi-dimensional variable length coding to encode runs of more than one consecutive non-zero-valued amplitudes. That is, for a run of "m" consecutive non-zero-valued coefficients, instead of using "m" one-dimensional variable length codes, a single 'm' dimensional code, e.g., coding table is used to code the entire 'm' coefficients. As an illustration, the sample coefficient sequence:

2 3 2 −1 −1 0 0 1 −1 1 | 0 0 . . .

can be encoded as:

$C_p(0, 5, 0)C_{A5}(2, 3, 2, 1, 1)S(0)S(0)S(0)S(1)S(1)C_p(1, 3, 1)C_{A3}(1, 1, 1)S(0)S(1)S(0)$ where $C_{A5}(2, 3, 2, 1, 1)$ is used to denote the 5-dimensional amplitude code of the event (2, 3, 2, 1, 1) and $C_{A3}(1, 1, 1)$ denotes the 3-dimensional amplitude code of the event (1, 1, 1).

While extending "m" one-dimensional amplitude codes to one m-dimensional amplitude code is possible, the size of the m-dimensional code table can become too large for some practical implementations. As an example, if the magnitude of the non-zero-valued coefficients is between 1 and 31, the size of the largest table can become as large as $31^m$. In order to make the size of the m-dimensional tables manageable for a practical implementation, the size of m in some embodiments is restricted to a relatively low number such as 2 or 3. The number of non-zero-valued coefficients beyond the restricted numbers is re-sorted back to use multiple one-dimensional tables.

Integrated Position and Amplitude Coding (mDPAInt), also Called Joint Position and Amplitude Coding.

Rather than encoding the position and amplitude of clustered non-zero-valued coefficients in the low-frequency region independently, some embodiments of low frequency encoding include jointly coding the position and the amplitude events. As an illustration, the sample coefficient sequence:

2 3 2 −1 −1 0 0 1 −1 1 | 0 0 . . .

can be encoded as:

$C_{pA}(0, 5, 0; 2, 3, 2, 1, 1)S(0)S(0)S(0)S(1)S(1)$ $C_{pA}(1, 3, 1; 1, 1, 1)S(0)S(1)S(0)$ where $C_{pA}(\cdot, \cdot, \ldots)$ represents a joint position and amplitude variable length code implemented, for example, using a joint position and amplitude variable length code table.

While joint (m+2)-dimensional position and amplitude coding without size limitation is possible, in a practical implementation, the size of the code table is typically limited. For example, the magnitude of the coefficients and the number of coefficient clusters is limited to relatively small values.

Integrated Position and Amplitude Coding with Low Valued Amplitude and Low Number of Clusters Coding, e.g., 3D Integrated Position and Amplitude Coding In clustered non-zero-valued coefficients, it was observed that the magnitude of the quantized transform coefficients is dominated by the magnitude value 1. One embodiment of integrated position and amplitude low-frequency region encoding exploits this to further improve the coding efficiency. More specifically, the appearances of clusters of consecutive runs of amplitude-1 coefficients or consecutive non-zero-non-amplitude-1 coefficients are extracted from the amplitude coefficient symbols and jointly encoded with 2D coefficient positions as an integrated 3D position/amplitude coding. Needless to say, all non-zero-valued coefficients with magnitude other than one must be coded by an additional 1D variable length code. Since it is already known that all the non-1 amplitudes have magnitudes of larger than 1, in one embodiment, their magnitudes are subtracted by 1 prior to encoding to construct shorter codewords.

Excluding the "last" information, one embodiment of integrated 3D position/amplitude events recognizes events that are defined by three quantities: run-length of any preceding zero coefficients, run-length of the non-zero-valued coefficients, and wherein the non-zero-valued coefficient is amplitude 1 or not. No immediately preceding run is indicated by a run-length of zero.

The size of the code table needed grows exponentially as the number of non-zero clusters increase. One embodiment includes limiting the size of the code table by limiting the maximum length of non-zero coefficient clusters. In one such embodiment, all the symbols with non-zero clusters exceeding the maximum cluster length are encoded by an "Escape" code followed by fixed numbers of bits indicating the corresponding information.

As an illustration, the sample coefficient sequence:

2 3 2 −1 −1 0 0 1 −1 1 | 0 0 can be encoded (including last) as:

$C_{pA}(0, 5, \text{xxx}11, 0)C'_A(1)S(0)C'_A(2)S(0)C'_A(1)S(0)S(1)S(1)C_{pA}(1, 3, 111, 1)\ S(0)S(1)S(0)$, where $C_{pA}(\cdot, \cdot, \cdot, \cdot)$ represents the variable length code for the integrated position/amplitude symbols including the run-length of zero-valued coefficients, the run-length of non-zero-valued coefficients, the 1/non-1 magnitudes, and the last information, and where $C'_A(\cdot)$ represents the 1D variable length code for one less than the magnitude of non-zero-valued coefficients that have amplitudes other than-one.

Other low-frequency and high-frequency encoding methods are possible, as described in the above-cited incorporated-by-reference patent applications.

Decoding

While the above descriptions were mostly of coding methods, those in the art will understand that the present description also leads to decoding methods and apparatuses that decode a bitstream that was coded by any of the coding embodiments described herein. The decoding method includes accepting a bitstream including codewords encoded by the coding method described above, including an encoding of the breakpoint locations, recognizing codewords in the bitstream and decoding the codewords.

Performance Evaluation

The inventors tested the presented approaches by implementing the methods in a coder that conforms to ITU-T recommendation H.263 (ITU-T, "Video coding for low bitrate communications," Draft Recommendation H.263, May 1996) using the reference codec software known as "Video Codec Test Model Near-Term, Version 3 (TMN3), Release 0", H.263 Ad Hoc Group. TMN 3.0 was previously released to the public by the Signal Processing and Multimedia Group, University of British Columbia, spmg.ece.ubc.ca. H.263 uses an 8×8-block DCT and run-level variable length coding for the quantized transform coefficients. Differently, for INTRA-coded blocks, the DC (0, 0) coefficient, after 8×8 DCT, is encoded separately and the remaining 63 AC coefficients are encoded by run-level variable length coding, whereas for INTER-coded blocks, all the 64 coefficients are encoded by run-level variable length coding. For multi-block partition, it is referred to 16×16-macroblock (MB), which contains four 8×8 blocks.

Video sequences used in the tests included three resolutions: QCIF (176×144), CIF (352×288), and 4CIF (704×576), with two sequences for each resolution. Each test sequence had 300 frames with a frame rate of 30 frames per second (fps). In every 15 frames 1 frame was enforced to be coded as an INTRA-frame. For both INTRA- and INTER-coded frames, a quantization parameter (QP) of 6 was used.

Each of the presented coding approaches was investigated following three steps: statistics collection, code-table generation, and codec implementation. In the first step, event statistics were collected from a set of test video sequences. Such statistics include the statistics of the breakpoint, the statistics of the low-frequency event, and the statistics of the high-frequency event. Each type of statistics was collected for INTRA- and INTER-coded blocks, respectively.

Using the collected statistics, Huffman code tables were generated for the variable length coding. To limit the size of the code tables, only events with non-zero frequencies in the statistics were assigned with code words. All the remaining events were coded by an 'Escape' code followed by certain numbers of bits to represent the information. For example, a 2D position event that is not assigned with a code word will be encoded by 'Escape' followed by 6 bits for the run-length of zeros, 6 bits for the run-length of non-zero coefficients, and 1 bit to indicate the last non-zero coefficient in the block.

While hybrid variable length coding code tables were constructed based on the statistics collected from test sequences, one embodiment of the methods described above included using initial code tables to find the optimal breakpoint and collect the statistics. This contradiction was resolved by using hybrid variable length coding code tables generated with a fixed breakpoint as initial tables and updating them iteratively with collected statistics. After that, the final code tables were generated.

The results showed that the methods described herein using variable breakpoints improved the coding performance of hybrid variable length coding on both INTRA- and INTER-coded blocks, compared to the case of constant breakpoint.

While the investigation the inventors performed used transform coefficients that were quantized using a quantization parameter (QP) of 6, other embodiments can use different quantization parameters. Tests with other sequences and other quantization parameters can lead to different, e.g., different optimized variable length coding tables.

Apparatus

While the above descriptions were mostly of coding methods, those in the art will understand that from the above description, a coding apparatus can straightforwardly be built, so that some embodiments of the invention are in the form of coding apparatuses. Furthermore, a decoding apparatus can be built.

Figure 7:
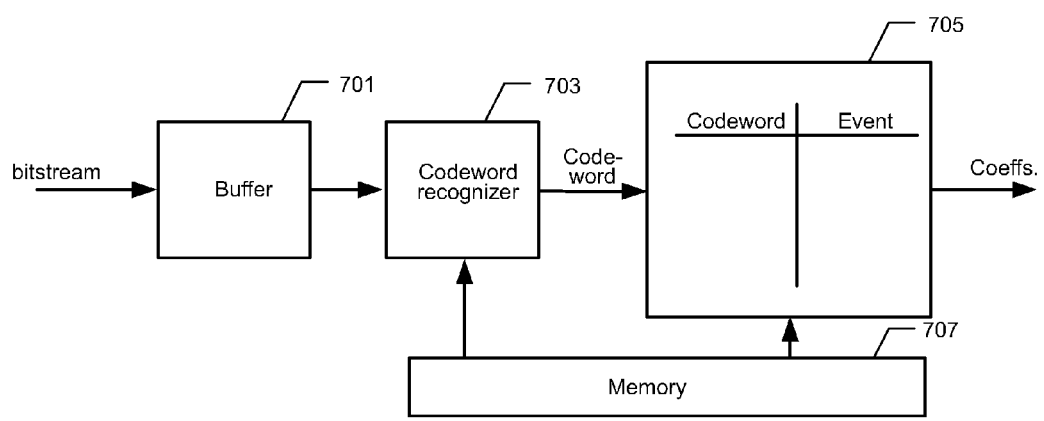
FIG. 7 shows one embodiment of a decoder operable to decode a bitstream that includes codewords encoded according to an embodiment of the method described herein.

FIG. 7 shows one embodiment of a decoder. The apparatus includes an input buffer 701 that is operable to accept a bitstream encoded by a compression method that includes a variable length coding method that, for example, includes a low-frequency coding method and a high frequency coding method. The low-frequency coding method uses an event recognizer and one or more coding tables to code recognized events. The coding method further includes determining a breakpoint and encoding the location of the breakpoint.

The output of the buffer acts as input to a codeword recognizer 703 that accepts the bits of the input bitstream and that is operable to determine which of the coding tables the codeword is from. A decoder 705 is coupled to the codeword recognizer 703 and is operable to determine the data for the codeword recognized by the codeword recognizer e.g., encoding of the breakpoint, whether a low-frequency or high frequency codeword, the run-length of non-zero-valued coefficients, the run-length of zero-valued coefficients, the amplitude(s), the sign, etc. In one embodiment, the decoder 705 includes a lookup device that looks up the appropriate decoding table stored in a memory 707. That table provides the event for at least some of the codewords of the set of codewords. Other codewords may include an "escape" code, so that decoding is by other than a table lookup method.

While in the embodiment shown in FIG. 7, the memory is shown separate from the lookup device (decoder) 705, those in the art will understand that in other embodiments, the lookup device 705 includes memory for the tables, and such other embodiments are included herein.

Figure 8:
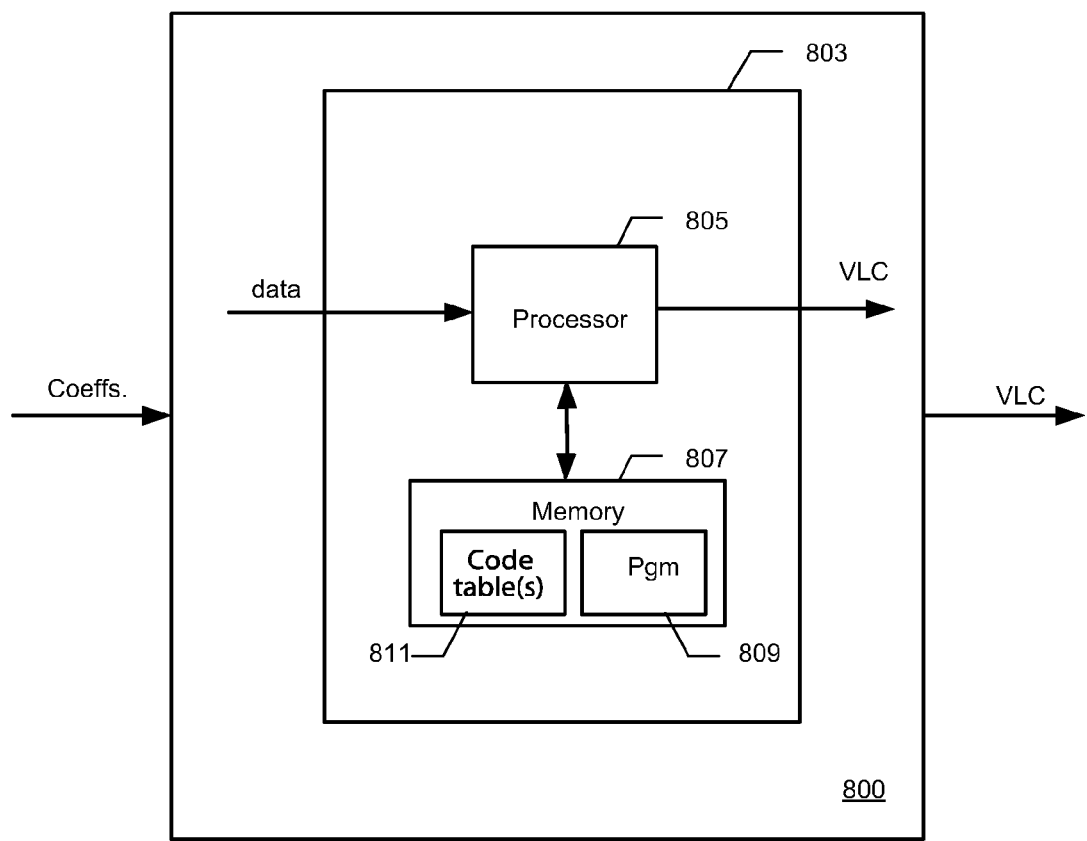
FIG. 8 shows an embodiment that includes an apparatus that is operable to implement a coding method as described herein.

FIG. 8 shows another embodiment that includes an apparatus 800 that is operable to implement a coding method as described herein, including determining a variable breakpoint and encoding the location of the breakpoint. Apparatus 800 includes processing system 803 that includes one or more processors 805 and a memory 807. A single processor is shown in FIG. 8 and those in the art will appreciate that this may represent several processors. Similarly, a single memory subsystem 807 is shown, and those in the art will appreciate that the memory subsystem may include different elements such as RAM, ROM, and so forth. In addition, the memory subsystem is meant to include any non-volatile memory storage such as a magnetic or optical storage component. A computer program 809 is included and is loaded into the memory 807. Note that at any time, some of the programs may be in the different parts of the memory subsystem, as will be understood by those in the art. The program 809 includes instructions to instruct the processor to implement, in different versions, the different coding methods usable as the second variable length coding method. In the embodiment shown, the method uses one or more coding tables 811 in the memory subsystem 807.

Figure 9:
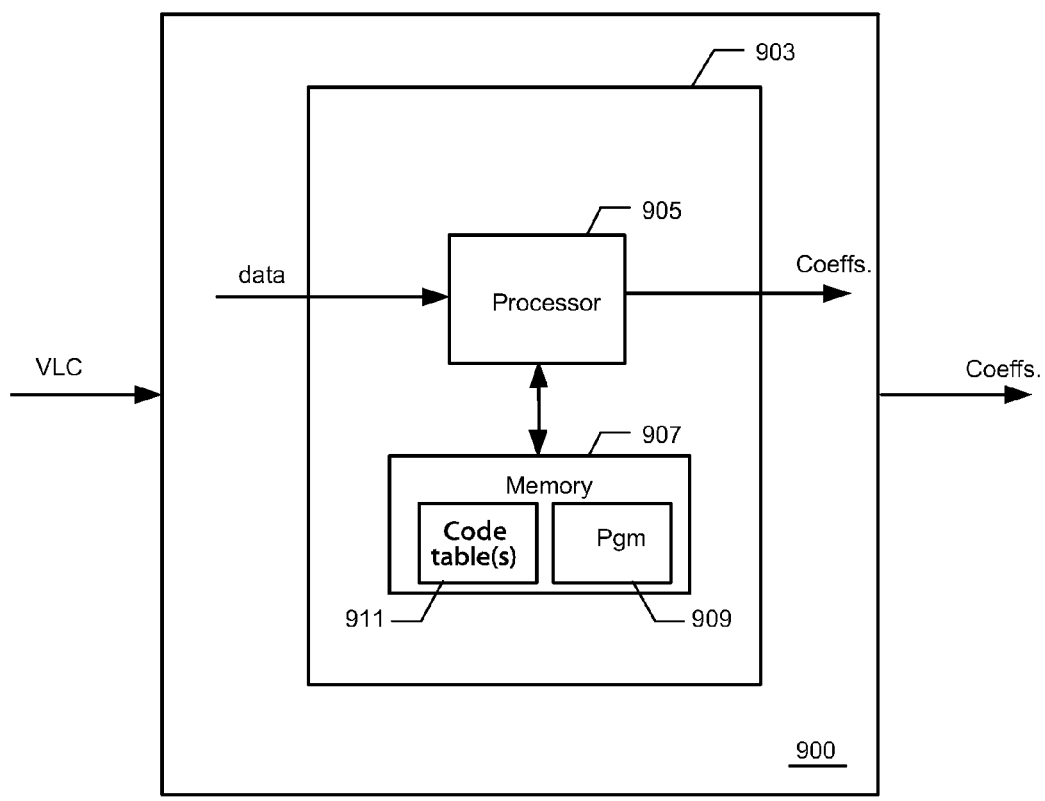
FIG. 9 shows ah embodiment that includes an apparatus operable to implement a decoder of a variable length coding method described herein

FIG. 9 shows another embodiment that includes an apparatus 900 operable to implement a decoder of a variable length coding method described herein that includes determining a variable breakpoint and encoding the location of the variable breakpoint. Decoding apparatus 900 includes a processing system 903 that includes one or more processors 905 and a memory 907. A single processor is shown in FIG. 9 and those in the art will appreciate that this may represent several processors. Similarly, a single memory subsystem 907 is shown, and those in the art will appreciate that the memory subsystem may include different elements such as RAM, ROM, and so forth. In addition, the memory subsystem is meant to include any non-volatile memory storage such as a magnetic or optical storage component. A computer program 909 is included and is loaded into the memory 907. Note that at any time, some of the programs may be in the different parts of the memory subsystem, as will be understood by those in the art. The program 909 includes instructions to instruct the processor to implement, in different versions, the recognizing and decoding of codewords. In the embodiment shown, the decoding method uses one or more coding tables 911 in the memory subsystem 907.

Other embodiments include logic encoded in one or more tangible media for execution and when executed operable to carry out any of the coding methods described herein. How to implement such logic would be clear to one in the art from the description herein.

Other embodiments include logic encoded in one or more tangible media for execution and when executed operable to carry out any of the decoding methods described herein. How to implement such logic would be clear to one in the art from the description herein.

Other embodiments include software encoded in one or more computer-readable media and when executed operable to carry out any of the coding methods described herein. How to implement such software would be clear to one in the art from the description herein.

Other embodiments include software encoded in one or more computer-readable media and when executed operable to carry out any of the decoding methods described herein. How to implement such software would be clear to one in the art from the description herein.

Other embodiments include a computer-readable carrier medium carrying a set of instructions that when executed by one or more processors of a processing system cause the one or more processors to carry out any of the coding methods described herein.

Other embodiments include a computer-readable carrier medium carrying a set of instructions that when executed by one or more processors of a processing system cause the one or more processors to carry out any of the decoding methods described herein.

As described above, alternative low-frequency coding schemes with variable breakpoints, such as the integrated position and amplitude coding, can be used. See the above-referenced and incorporated herein by reference patent applications for alternate low-frequency and high-frequency methods.

The term "sequence" as used herein for the sequence of quantized coefficients is sometimes referred to as a "block" of coefficients, and also as a "series" of coefficients. Those in the art will understand that such terms may be interchangeably used and the meaning would be clear to those in the art from the context.

Note that the description herein assumes that each series includes two regions, a low-frequency region, and a high-frequency region. It is possible to partition the whole sequence containing all the coefficients of the transforming, quantizing and ordering the block of image data. The methods described herein would then be applicable to a sequence that does not necessarily include all of the quantized coefficients but that still includes a low-frequency region where non-zero-valued quantized coefficients are likely to be clustered, and an immediately following high-frequency region where non-zero-valued quantized coefficients are likely to be scattered amongst zero-valued quantized coefficients. Those in the art will therefore understand that the claims herein are applicable to such a case, the breakpoint being the location between the low- and high-frequency regions. For example, the sequence in such a case could include just low- and high-frequency regions and not the whole sequence of quantized transform coefficients.

Also, in the description, it is assumed that the sequence includes only the AC coefficients and that the DC coefficient of the transform of the block is separately encoded. How to modify the methods described herein to include the DC coefficient would be clear to those in the art.

Furthermore, in the description of example embodiments it was assumed that the quantization of coefficients is such that zero is the most likely to occur amplitude, and 1 is the next most likely to occur amplitude. Of course it is possible to quantize in a manner so that other values or symbols are used for the most likely-to-occur quantized value or values, and different other values or symbols are used for the next most likely-to-occur quantized value or values. Those in the art will understand how to modify the particulars described herein to accommodate such variations, and such variations are certainly meant to be within the scope of the present invention.

Furthermore, the invention is not limited to any one type of architecture or type of transform encoding. The discrete cosine transform (DCT) is one possible transform. Other transforms may be used, e.g., the new H.264/MEG-4 AVC video coding standard/draft standard defines 4×4 blocks and a DCT-like 4×4 integer transform.

The invention does not depend on any particular type of inter-frame coding if used, or of motion compensation if used for inter-frame coding, or any intra-estimation if used for estimating the pixels of a block using information from neighboring blocks.

Note that variable length coding is sometimes referred to as entropy coding or statistical coding.

Note that the terms coding and encoding are used interchangeably herein.

In some of the embodiments described above, no sign data was included. Most transforms produce positive and negative coefficients, and the forming of the codeword includes an indication of the sign of any non-zero-valued coefficients. In one version, the sign information for any runs of non-zero amplitudes in any region is added together with the information of each amplitude. In an alternate embodiment, the sign information for any runs of non-zero amplitudes in any region may be included in a different manner, e.g., as a code for the series of signs. Other alternate embodiments are also possible for encoding the sign.

Note that in some examples for amplitude encoding, 63 or 127 possible non-zero values can be assumed for the coefficients. The invention however is not restricted to any number of possible quantization values.

Note also that the term amplitude is irrespective of sign. Therefore, for example, coefficient of values +1 and −1 both have amplitude 1.

While one embodiment described herein includes a memory that stores coding tables, other embodiments store the coding information in the form of a data structure other than a table, e.g., a structure that includes a tree. Other data structures may also be used. Similarly, while one embodiment described herein includes a memory that stores a decoding, other embodiments store the decoding information in the form of a data structure other than a table for the decoding.

Note also that the present invention does not depend on the particular type of variable length coding used for any of the coding methods, e.g., the coding tables, and can work, for example, with Huffman coding and with arithmetic coding methods. Furthermore, while embodiments have been described that use fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

Unless specifically stated otherwise, as apparent from the following discussions, it is appreciated that throughout the specification discussions using terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps, is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of coder, or a decoder. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, (i) in one set of embodiment, a tangible computer-readable medium, e.g., a solid-state memory, or a computer software product encoded in computer-readable optical or magnetic media; (ii) in a different set of embodiments, a medium bearing a propagated signal detectable by at least one processor of one or more processors and representing a set of instructions that when executed implement a method; (iii) in a different set of embodiments, a carrier wave bearing a propagated signal detectable by at least one processor of the one or more processors and representing the set of instructions a propagated signal and representing the set of instructions; (iv) in a different set of embodiments, a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All U.S. patents, and U.S. patent applications cited herein are hereby incorporated by reference, except that the incorporation by reference of the material herein excludes any information incorporated by reference in such incorporated by reference material, unless such information is explicitly incorporated herein by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
 (a) for an ordered sequence of quantized transform coefficients of a block of image data, the quantized transform coefficients having respective amplitudes including a most likely-to-occur amplitude and at least one other amplitude, and for a selected low-frequency variable length coding method that includes recognizing events that each includes a cluster of coefficients having respective amplitudes other than the most likely-to-occur amplitude,
  (a1) determining a set of possible breakpoints, each breakpoint being defined by an ending event location for events recognized in using the selected low-frequency variable length coding method, and
  (a2) determining the results of coding the ordered sequence using a hybrid coding method that includes using the selected low-frequency coding method until the ending event, and using a selected high-frequency method to encode a part of the sequence starting from immediately after the ending event;
 (b) comparing the results determined in (a2) to encode the sequence for each of the set of possible breakpoints determined in (a1), each possible breakpoint defined by an ending event recognized using the selected low-frequency variable length coding method, the result for a particular possible breakpoint of the set being the sum of a first number of bits resulting from the encoding a first part of the sequence up to and including the ending event of the particular possible breakpoint using the selected low-frequency variable length coding method, and a second number of bits resulting from encoding a second part of the sequence starting from the coefficient immediately after the ending event of the particular possible breakpoint using the selected high-frequency variable length coding method, wherein for each of the set of possible breakpoints, the first number of bits for encoding a first part of the sequence up to and including the ending event of the breakpoint is determined using the selected low-frequency variable length coding method in a forward-scan order such that a first set of first numbers of bits is determined, and for each of the set of possible breakpoints, the second number of bits for encoding a second part of the sequence starting from the coefficient immediately after the ending events is determined using the high-frequency variable length coding in a reverse-scan order, such that a second set of second numbers of bits determined;

(c) selecting as a final ending event the possible ending event that results in the least sum of a first number of bits from the first set and a second number of bits from the second set; and (d) encoding the sequence including encoding a first portion of the sequence up to and including the final ending event using the selected low-frequency variable length coding method and encoding a second portion of the sequence from the first coefficient after the final ending event to the end of the sequence using the selected high-frequency variable length coding method.

2. A method as recited in claim 1, wherein (a) includes:
encoding the ordered sequence of quantized transform coefficients of the block of image data using a selected low-frequency variable length coding method;
encoding the ordered sequence using the selected high-frequency variable length coding method to determine the numbers of bits to encode different parts of the sequence, each different part starting from the coefficient immediately after respective different ending event locations of the different events recognized in the selected low-frequency method used in (a), and
determining the total number of bits to encode the sequence for different possible breakpoints, each defined by an ending event of events recognized in using the low-frequency variable length coding method, the total number of bits being the number of bits resulting from encoding a first part of the sequence up to and including the ending event using the selected low-frequency variable length coding method, and the number of bits resulting from encoding a second part of the sequence starting from the coefficient immediately after respective different ending events using the selected high-frequency variable length coding method.

3. A method as recited in claim 2, wherein the quantized transform coefficients are such that 0 is the most likely to occur amplitude, and 1 is the next to most likely to occur amplitude.

4. A method as recited in claim 2, further comprising encoding the location of the final ending event.

5. A method as recited in claim 4, wherein the encoding of the location uses a variable length code and encodes any position in the sequence of coefficients from the start to the end of the final ending event.

6. A method as recited in claim 5, wherein the encoding of the location encodes the starting position of the final ending event.

7. A method as recited in claim 4, wherein the encoding of the location uses a breakpoint variable length coding method and encodes information specifying the ordinal position of the final ending event, such that in the case the final ending event is the $n^{th}$ recognized event using the selected low-frequency variable length coding method, n being an integer, the encoding of the location is the encoding of the number n using the breakpoint variable length coding method.

8. A method as recited in claim 4, wherein the encoding of the location of the final ending event is jointly with other locations of final ending events determined for other sequences.

9. A method as recited in claim 2, further comprising repeating (a) to (e) for a plurality of sequences of quantized transform coefficients for a respective plurality of blocks such that more than one final ending event location is selected, and jointly encoding a plurality of locations of final ending events using a multidimensional variable length coding method.

10. A method as recited in claim 2, further comprising:
repeating (a) to (e) for any one or more sequences in a plurality of sequences of quantized transform coefficients for a respective plurality of blocks that have at least one quantized transform coefficient that has other than the most likely-to-occur value, such that one or more corresponding final ending event location are selected;
encoding an indication of any sequence of the plurality of sequences that has only quantized transform coefficients of the most likely-to-occur value; and
jointly encoding the one or more selected locations of final ending events of those sequences that have at least one coefficient that has other than the most likely-to-occur value, such that in the case a plurality locations of final ending events are jointly encoded, the variable length coding method is a multidimensional variable length coding method.

11. A method as recited in claim 2, wherein the selected low-frequency coding method includes one-dimensional position and one-dimensional amplitude coding.

12. A method as recited in claim 2, wherein the selected low-frequency coding method includes two-dimensional position and one-dimensional amplitude coding.

13. A method as recited in claim 2, wherein the selected low-frequency coding method includes integrated position and amplitude coding.

14. A method as recited in claim 2, wherein the selected low-frequency coding method includes two-dimensional position and multi-dimensional amplitude coding.

15. A method as recited in claim 2, wherein the selected low-frequency coding method includes integrated position and amplitude coding with low valued amplitude and low number of clusters coding.

16. An apparatus comprising
one or more processors; and
a hardware storage subsystem, the hardware storage subsystem including instructions that when executed by at least one of the processors causes the apparatus to:
(a) encode an ordered sequence of quantized transform coefficients of a block of image data, the quantized transform coefficients having respective amplitudes including a most likely-to-occur amplitude and at least one other amplitude, the encoding using a selected low-frequency variable length coding method that includes recognizing events that each includes a cluster of coefficients having respective amplitudes other than the most likely-to-occur amplitude;

(b) encode the ordered sequence using a selected high-frequency variable length coding method to determine the numbers of bits to encode different parts of the sequence, each different part starting from the coefficient immediately after respective different event locations of the different events recognized in the selected low-frequency method used in (a);

(c) compare the results as total numbers of bits to encode the sequence for different ending event locations for events recognized in (a), each result being the sum of a first number of bits resulting from the encoding in (a) to encode a first part of the sequence up to and including the ending event, and a second number of bits resulting from the encoding of (b) to encode a second part of the sequence starting from the coefficient immediately after respective different ending events, wherein for each ending event, the first number of bits for encoding the first part of the sequence up to and including the ending event is determined using the selected low-frequency variable length coding method in a forward-scan order such that a first set of first numbers of bits is determined, and for each ending event, the second number of bits for encoding the second part of the sequence starting from the coefficient immediately after the ending events is determined using the high-frequency variable length coding in a reverse-scan order, such that a second set of second numbers of bits is determined;

(d) select as a final ending event the ending event that results in the least total number of bits in the comparing of (c); and (e) encode the sequence including encoding a first portion of the sequence up to and including the final ending event using the selected low-frequency variable length coding method and encoding a second portion of the sequence from the first coefficient after the final ending event to the end of the sequence using the selected high-frequency variable length coding method.

17. A computer-readable hardware storage medium storing instructions that when executed by one or more processors of a processing system in an apparatus, cause the apparatus to:

(a) encode an ordered sequence of quantized transform coefficients of a block of image data, the quantized transform coefficients having respective amplitudes including a most likely-to-occur amplitude and at least one other amplitude, the encoding using a selected low-frequency variable length coding method that includes recognizing events that each includes a cluster of coefficients having respective amplitudes other than the most likely-to-occur amplitude;

(b) encode the ordered sequence using a selected high-frequency variable length coding method to determine the numbers of bits to encode different parts of the sequence, each different part starting from the coefficient immediately after respective different event locations of the different events recognized in the selected low-frequency method used in (a);

(c) compare the results as total numbers of bits to encode the sequence for different ending event locations for events recognized in (a), each result being the sum of a first number of bits resulting from the encoding in (a) to encode a first part of the sequence up to and including the ending event, and a second number of bits resulting from the encoding of (b) to encode a second part of the sequence starting from the coefficient immediately after respective different ending events, wherein for each ending event, the first number of bits for encoding the first part of the sequence up to and including the ending event is determined using the selected low-frequency variable length coding method in a forward-scan order such that a first set of first numbers of bits is determined, and for each ending event, the second number of bits for encoding the second part of the sequence starting from the coefficient immediately after the ending events is determined using the high-frequency variable length coding in a reverse-scan order, such that a second set of second numbers of bits is determined;

(d) select as a final ending event the ending event that results in the least total number of bits in the comparing of (c); and (e) encode the sequence including encoding a first portion of the sequence up to and including the final ending event using the selected low-frequency variable length coding method and encoding a second portion of the sequence from the first coefficient after the final ending event to the end of the sequence using the selected high-frequency variable length coding method.

18. A computer-readable hardware storage medium storing instructions that when executed by one or more processors of a processing system in an apparatus, cause the apparatus to:

(a) encode an ordered sequence of quantized transform coefficients of a block of image data, the quantized transform coefficients having respective amplitudes including a most likely-to-occur amplitude and at least one other amplitude, the encoding using a selected low-frequency variable length coding method that includes recognizing events that each includes a cluster of coefficients having respective amplitudes other than the most likely-to-occur amplitude;

(b) encode the ordered sequence using a selected high-frequency variable length coding method to determine the numbers of bits to encode different parts of the sequence, each different part starting from the coefficient immediately after respective different event locations of the different events recognized in the selected low-frequency method used in (a);

(c) compare the results as numbers of bits to encode the sequence for different ending event locations for events recognized in (a), each result being the sum of a first number of bits resulting from the encoding in (a) to encode a first part of the sequence up to and including the ending event, and a second number of bits resulting from the encoding of (b) to encode a second part of the sequence starting from the coefficient immediately after respective different ending events, wherein for each ending event, the first number of bits for encoding the first part of the sequence up to and including the ending event is determined using the selected low-frequency variable length coding method in a forward-scan order such that a first set of first numbers of bits is determined, and for each ending event, the second number of bits for encoding the second part of the sequence starting from the coefficient immediately after the ending events is determined using the high-frequency variable length coding in a reverse-scan order, such that a second set of second numbers of bits is determined;

(d) select as a final ending event the ending event that results in the least total number of bits in the comparing of (c); and (e) encode the sequence including encoding a first portion of the sequence up to and including the final ending event using the selected low-frequency variable length coding method and encoding a second portion of the sequence from the first coefficient after the final ending event to the end of the sequence using the selected high-frequency variable length coding method.

19. A computer-readable hardware storage medium as recited in claim 18, wherein the quantized transform coefficients are such that 0 is the most likely to occur amplitude, and 1 is the next to most likely to occur amplitude.

20. A computer-readable hardware storage medium as recited in claim 18, wherein the instructions when executed further cause the apparatus to encode the location of the final ending event.

21. A computer-readable hardware storage medium as recited in claim 20, wherein the encoding of the location of the final ending event is jointly with other locations of final ending events determined for other sequences.

22. A method of decoding comprising:
accepting a bitstream that includes codewords encoded by a coding method, the encoding method including:
  (a) encoding an ordered sequence of quantized transform coefficients of a block of image data, the quantized transform coefficients having respective amplitudes including a most likely-to-occur amplitude and at least one other amplitude, the encoding using a selected low-frequency variable length coding method that includes recognizing events that each includes a cluster of coefficients having respective amplitudes other than the most likely-to-occur amplitude;
  (b) encoding the ordered sequence using a selected high-frequency variable length coding method to determine the numbers of bits to encode different parts of the sequence, each different part starting from the coefficient immediately after respective different event locations of the different events recognized in the selected low-frequency method used in (a);
  (c) comparing the results as total numbers of bits to encode the sequence for different ending event locations for events recognized in (a), each result being the sum of a first number of bits resulting from the encoding in (a) to encode a first part of the sequence up to and including the ending event, and a second number of bits resulting from the encoding of (b) to encode a second part of the sequence starting from the coefficient immediately after respective different ending events, wherein for each ending event, the first number of bits for encoding the first part of the sequence up to and including the ending event is determined using the selected low-frequency variable length coding method in a forward-scan order such that a first set of first numbers of bits is determined, and for each ending event, the second number of bits for encoding the second part of the sequence starting from the coefficient immediately after the ending events is determined using the high-frequency variable length coding in a reverse-scan order, such that a second set of second numbers of bits is determined;
  (d) selecting as a final ending event the ending event that results in the least total number of bits in the comparing of (c);
  (e) encoding the sequence including encoding a first portion of the sequence up to and including the final ending event using the selected low-frequency variable length coding method and encoding a second portion of the sequence from the first coefficient after the final ending event to the end of the sequence using the selected high-frequency variable length coding method; and
  (f) encoding the location of the final ending event;
recognizing codewords in the bitstream; and
decoding the recognized codewords.

23. A tangible computer-readable hardware storage medium encoded with instructions that when executed by one or more processors of a processing system in an apparatus, cause the apparatus to:
accept a bitstream that includes codewords encoded by a coding method, the encoding method including:
  (a) encoding an ordered sequence of quantized transform coefficients of a block of image data, the quantized transform coefficients having respective amplitudes including a most likely-to-occur amplitude and at least one other amplitude, the encoding using a selected low-frequency variable length coding method that includes recognizing events that each includes a cluster of coefficients having respective amplitudes other than the most likely-to-occur amplitude;
  (b) encoding the ordered sequence using a selected high-frequency variable length coding method to determine the numbers of bits to encode different parts of the sequence, each different part starting from the coefficient immediately after respective different event locations of the different events recognized in the selected low-frequency method used in (a);
  (c) comparing the results as total numbers of bits to encode the sequence for different ending event locations for events recognized in (a), each result being the sum of a first number of bits resulting from the encoding in (a) to encode a first part of the sequence up to and including the ending event, and a second number of bits resulting from the encoding of (b) to encode a second part of the sequence starting from the coefficient immediately after respective different ending events, wherein for each ending event, the first number of bits for encoding the first part of the sequence up to and including the ending event is determined using the selected low-frequency variable length coding method in a forward-scan order such that a first set of first numbers of bits is determined, and for each ending event, the second number of bits for encoding the second part of the sequence starting from the coefficient immediately after the ending events is determined using the high-frequency variable length coding in a reverse-scan order, such that a second set of second numbers of bits is determined;
  (d) selecting as a final ending event the ending event that results in the least total number of bits in the comparing of (c);
  (e) encoding the sequence including encoding a first portion of the sequence up to and including the final ending event using the selected low-frequency variable length coding method and encoding a second portion of the sequence from the first coefficient after the final ending event to the end of the sequence using the selected high-frequency variable length coding method; and
  (f) encoding the location of the final ending event;
recognize codewords in the bitstream; and
decode the recognized codewords.

* * * * *

UNITED STATES PATENT AND TRADEMARK OFFICE
CERTIFICATE OF CORRECTION

| | | |
|---|---|---|
| PATENT NO. | : 7,949,195 B2 | Page 1 of 1 |
| APPLICATION NO. | : 11/686778 | |
| DATED | : May 24, 2011 | |
| INVENTOR(S) | : Tian et al. | |

It is certified that error appears in the above-identified patent and that said Letters Patent is hereby corrected as shown below:

In Column 26, line 42, before "numbers", kindly insert --total--.

Signed and Sealed this
Second Day of August, 2011

David J. Kappos
*Director of the United States Patent and Trademark Office*